United States Patent
Choi et al.

(10) Patent No.: US 9,549,050 B2
(45) Date of Patent: Jan. 17, 2017

(54) HOUSING, PROCESSING METHOD THEREOF, AND ELECTRONIC DEVICE USING THE SAME

(71) Applicant: Samsung Electronics Co., Ltd., Gyeonggi-do (KR)

(72) Inventors: Jong-Chul Choi, Gyeonggi-do (KR); Hee-Cheul Moon, Gyeonggi-do (KR); Ik-Su Jung, Gyeonggi-do (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 259 days.

(21) Appl. No.: 14/154,496

(22) Filed: Jan. 14, 2014

(65) Prior Publication Data

US 2014/0228080 A1    Aug. 14, 2014

(30) Foreign Application Priority Data

Feb. 8, 2013  (KR) .................. 10-2013-0014674

(51) Int. Cl.
| | |
|---|---|
| *H04M 1/02* | (2006.01) |
| *B29C 45/14* | (2006.01) |
| *B29C 45/00* | (2006.01) |
| *B29L 31/34* | (2006.01) |

(52) U.S. Cl.
CPC ........ *H04M 1/0249* (2013.01); *B29C 45/0055* (2013.01); *B29C 45/14639* (2013.01); *H04M 1/0283* (2013.01); *B29L 2031/3481* (2013.01); *Y10T 29/49826* (2015.01)

(58) Field of Classification Search
CPC .... H04B 1/3877; A45F 5/00; A45F 2005/008; A45F 2005/1013; A45C 11/00; A45C 13/30; B65D 25/30; H04M 1/0283; H04M 1/0249; B29L 2031/3481; B29C 45/0055; B29C 45/14639; Y10T 29/49826
See application file for complete search history.

(56) References Cited

U.S. PATENT DOCUMENTS

| | | | | |
|---|---|---|---|---|
| 8,024,016 | B2* | 9/2011 | Lim ................... | H04M 1/0283 455/575.4 |
| 2004/0229668 | A1* | 11/2004 | Lin .................... | H04M 1/0283 455/575.3 |
| 2006/0213940 | A1 | 9/2006 | Chen et al. | |
| 2007/0010219 | A1 | 1/2007 | Qin et al. | |
| 2007/0093140 | A1 | 4/2007 | Begic et al. | |

(Continued)

FOREIGN PATENT DOCUMENTS

| | | | |
|---|---|---|---|
| CN | 1781299 | A | 5/2006 |
| CN | 1838865 | A | 9/2006 |

(Continued)

OTHER PUBLICATIONS

Chinese Search Report dated Mar. 22, 2016.

*Primary Examiner* — Thanh Le
(74) *Attorney, Agent, or Firm* — Cha & Reiter, LLC

(57) ABSTRACT

An electronic device is provided including a plurality of electronic parts; one or more housing components forming a space for receiving the plurality of electronic parts; and a cover detachable from the one or more housing components, the cover including a first member having a plurality of metal elements suspended in a non-metal base and a second member coupled to the first member.

10 Claims, 24 Drawing Sheets

(56) References Cited

U.S. PATENT DOCUMENTS

| | | | |
|---|---|---|---|
| 2010/0156739 A1* | 6/2010 | Kwak | H01Q 1/526 343/841 |
| 2011/0165916 A1 | 7/2011 | Park et al. | |
| 2011/0187245 A1 | 8/2011 | Pakula et al. | |
| 2011/0315421 A1 | 12/2011 | Ye | |
| 2013/0033158 A1* | 2/2013 | Schmidt | B29C 45/14336 312/223.1 |
| 2013/0323579 A1 | 12/2013 | Hwang et al. | |

FOREIGN PATENT DOCUMENTS

| | | |
|---|---|---|
| CN | 1893146 A | 1/2007 |
| CN | 101001506 A | 7/2007 |
| CN | 102118930 A | 7/2011 |
| CN | 102300422 A | 12/2011 |
| CN | 103458641 A | 12/2013 |
| DE | 20 2010 014 774 U1 | 3/2012 |
| DE | 20 2011 103 932 U1 | 1/2013 |
| EP | 1 219 401 A2 | 7/2002 |
| EP | 2 341 698 A1 | 7/2011 |
| EP | 2 390 019 A1 | 11/2011 |
| EP | 2 670 116 A1 | 12/2013 |

* cited by examiner

HOUSING, PROCESSING METHOD THEREOF, AND ELECTRONIC DEVICE USING THE SAME

CLAIM OF PRIORITY

This application claims the benefit under 35 U.S.C. §119 (a) of a Korean patent application filed in the Korean Intellectual Property Office on Feb. 8, 2013 and assigned Serial No. 10-2013-0014674, the entire disclosure of which is hereby incorporated by reference.

BACKGROUND

1. Field of the Disclosure

The present disclosure relates to electronic devices, and more particularly to electronic device housing enclosures.

2. Description of the Related Art

As wireless communications have advanced, it has become common for electronic devices to include one or more antennas, such as antennas for cellular communications and antennas for accessing Wi-Fi. Incorporating such antennas into electronic devices is a non-trivial task. The manner in which antennas are integrated into electronic devices can directly affect the electronic devices' appearance and size. Accordingly, the need exists for antenna integration techniques that achieve an elegant appearance and miniaturization of electronic devices.

SUMMARY

The present disclosure addresses this need. According to one aspect of the disclosure, an electronic device is provided comprising: a plurality of electronic parts; one or more housing components forming a space for receiving the plurality of electronic parts; and a cover detachable from the one or more housing components, the cover including a first member having a plurality of metal elements suspended in a non-metal base and a second member coupled to the first member.

According to another aspect of the disclosure, a method for processing a housing of an electronic device is provided, the method comprising: forming a metal housing component including: (i) a plurality of separated metal elements forming an inner surface and an outer surface of the metal housing component and (ii) a plurality of bridges disposed on the inner surface of the metal housing component and connecting the plurality of metal elements; forming a non-metal base on the metal housing component via insert injection; and removing the plurality of bridges from the metal housing component.

According to yet another aspect of the disclosure, an electronic device is provided comprising a front housing component; a rear housing component coupled with the front housing component to form a space for receiving a plurality of electronic parts of the electronic device; and a detachable cover coupled with the rear housing component to form a space for receiving at least one of a Subscriber Identity Module (SIM) card, a memory card, and a battery, the cover comprising: a first member comprising a plurality of separated metal elements suspended in a non-metal base and forming an outer surface of the first member in which portions of the non-metal base fill spaces between the metal elements so that the portions of the non-metal base are substantially flush with the metal element's outer surfaces; and a second member coupled to the first member by a latching member that is part of the second member, so that an outer surface of the second member is substantially flush with the outer surface of the first member.

Other aspects, advantages and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects of the present disclosure will become more clear from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of examples provided throughout the disclosure. It includes various specific details to assist in that understanding but these details are provided as examples only. Accordingly, those of ordinary skill in the art will recognize that various changes and modifications of the examples described herein can be made without departing from the scope and spirit of the disclosure. Also, descriptions of well-known functions and constructions are omitted for clarity and conciseness. The terms and words used in the following description and claims are not limited to the bibliographical meanings, but are merely used to enable a clear and consistent understanding of the disclosure. Accordingly, it should be clear that the following description is provided for illustrative purposes only.

Figure 1:
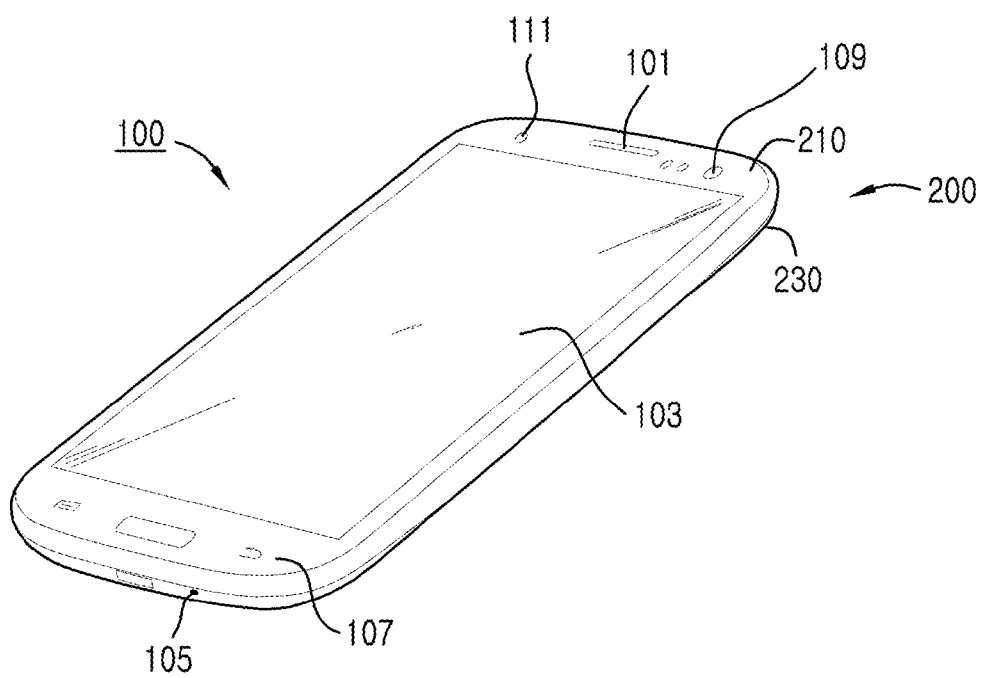
FIG. 1 and FIG. 2 are diagrams of an electronic device according to aspects of the present disclosure.
Figure 2:
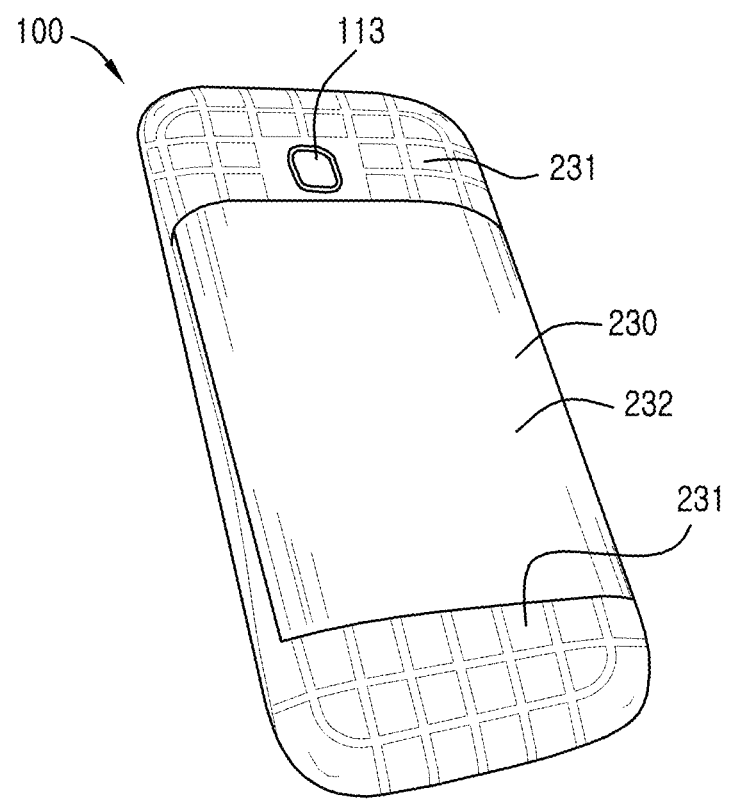
Figure 3:
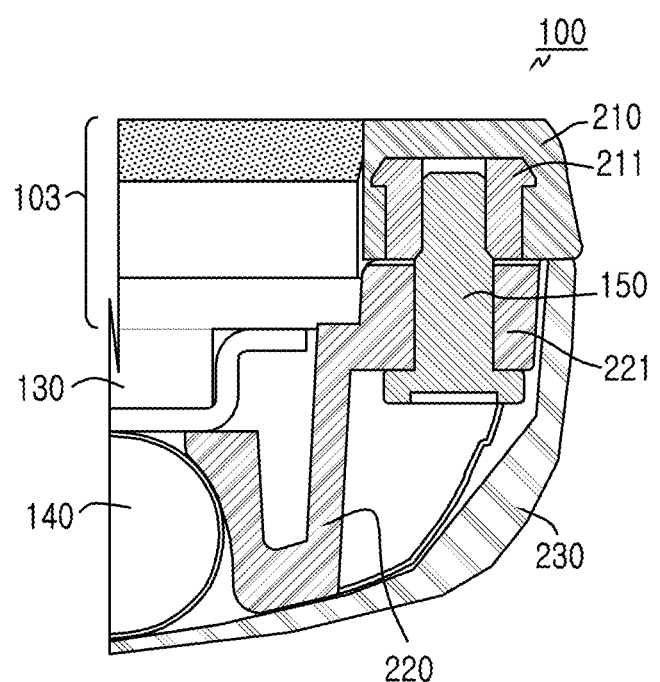
FIG. 3 is a cross-sectional view of the electronic device of FIGS. 1 and 2 according to aspects of the present disclosure.

FIGS. 1 and 2 are diagrams of an electronic device 100 according to aspects of the disclosure and FIG. 3 is a cross-sectional view of the electronic device according to aspects of the disclosure. As illustrated, the electronic device 100 may include a speaker 101 for outputting a sound, a touchscreen 103, a microphone 105 positioned below the touchscreen 103, a keypad 107 on which input buttons are arranged, a front camera 109, and a rear camera 113. The speaker, 101, touchscreen 103, microphone 105, keypad 107, and camera 109 are disposed in a receiving space of a housing 200. The housing 200 may include a front housing 210, a rear housing 220, and a battery cover 230.

The front housing 210 and the rear housing 220 are coupled to each other, and the battery cover 230 covers the rear housing 220. The front housing 210 is disposed in the front of the electronic device 100, and the battery cover 230 is disposed in the backside of the electronic device 100.

The front housing 210 and the rear housing 220 are coupled to each other to form a receiving space having an opening. The touchscreen 103 and the mainboard 130 are disposed in the receiving space formed by the coupling of the front housing 210 and the rear housing 220. The touchscreen 103 is disposed on a mainboard 130 and includes a window and a display. The mainboard 130 may include a substrate on which electronic circuit(s) and various other electronic components are mounted.

A battery 140 is received in a space formed by coupling of the rear housing 220 and the battery cover 230. The battery cover 230 includes a first housing member 231 and a second housing member 232. As illustrated, in some implementations, the second housing member 232 may be formed in an opening formed inside the first housing member 231. The first housing member 231 may include a plurality of elements. In some implementations, each of the elements may be made from metal. Furthermore, in some implementations, each element may be disposed on an underlying plastic injection member.

Because the metal elements are separated from one another, the first hosing member may let signals transmitted or received by the electronic device to pass through without the signals being blocked. Also, the second appearance member 232 is formed of non-metal. The second housing member 232 may occupy more than 50% of the battery cover 230. The at least one antenna of the electronic device 100 may include at least one of an antenna mounted on the mainboard 130, an antenna prepared on the inner surface of the battery cover 230, an antenna prepared on the battery 140, etc. For example, the battery cover 230 may have an antenna (ex: Near Field Communication (NFC) antenna) disposed on the inner surface thereof. When the battery cover 230 is coupled to the rear housing 220, a connector terminal of the mainboard 130 that is situated in the rear housing 220 may electrically contact the NFC antenna in order to transmit and receive signals by the antenna. As described above, since the first housing member 231 of the battery cover 230 has the separated metal elements and the second housing member 232 of the battery cover 230 is non-metal, the antenna of the battery cover 230 may receive or transmit signals without those signals being blocked by the first housing member 231 and/or the second housing member 232. Also, the battery 140 may have an antenna disposed outside a battery cell. In instances where the battery 140 is fit in a recess of the rear housing 220, a connection terminal of the mainboard 130 situated in the recess of the rear housing 220 may electrically contact the antenna of the battery 140. The antenna of the battery 140 may receive signals from the mainboard 130 for transmission. As described above, because the first housing member 231 of the battery cover 230 has the separated metal pieces and the second housing member 232 of the battery cover 230 is non-metal, the battery cover 230 may let signals transmitted/received by antennas located underneath the battery cover 230 without those signals being blocked.

The front housing 210 forms a boss 211 for screw coupling with the rear housing 220. The boss 211 includes a screw fasten portion having a screw hole that couples with a screw. The screw fasten portion may be metal and formed inside the boss 211 during injection forming. The rear housing 220 forms a boss fasten hole 221 that couples with the boss 211 of the front housing 210. A screw 150 passes through the boss fasten hole 221 of the rear housing 220, and is fastened to the boss 211 of the front housing 210, so that the front housing 210 and the rear housing 220 are coupled to each other.

Figure 4:
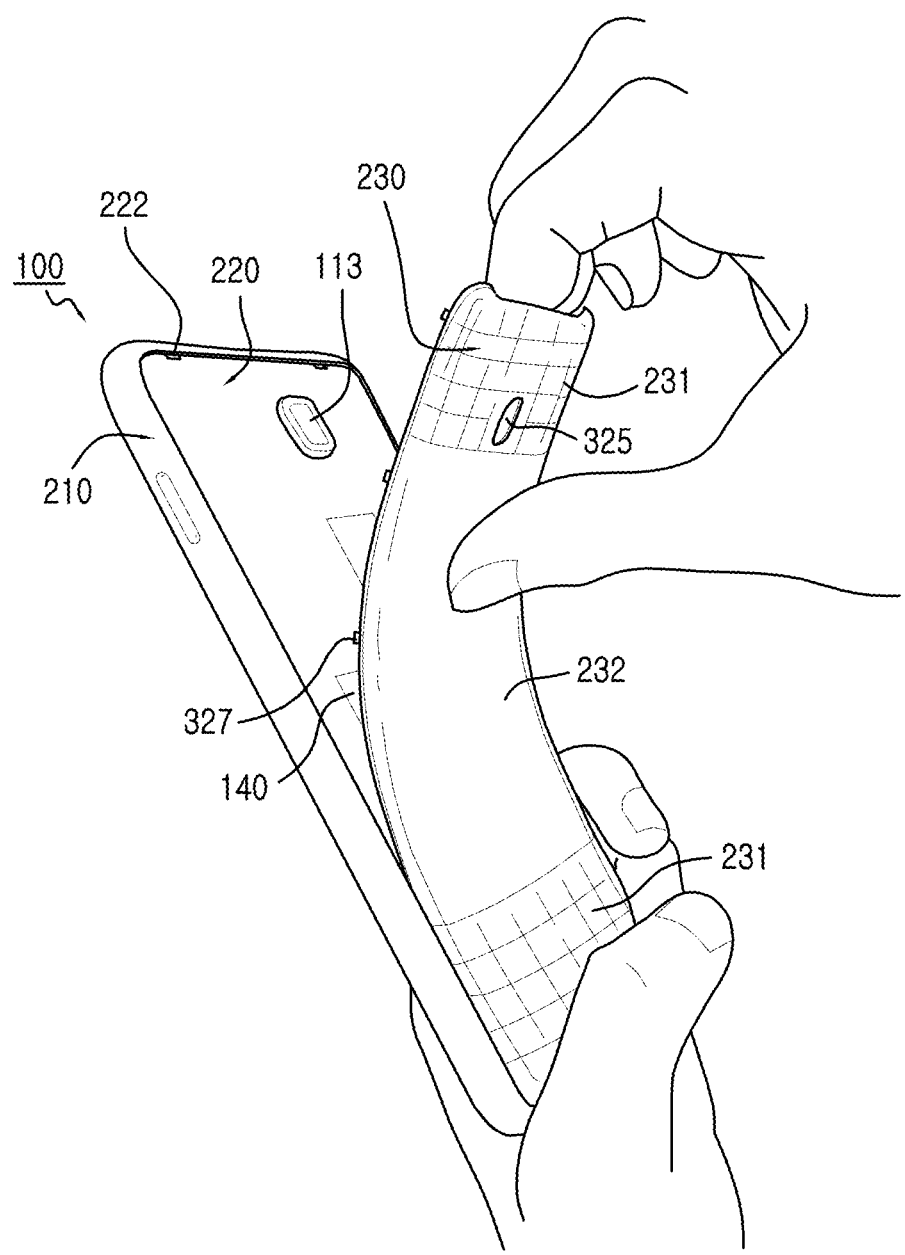
FIG. 4 is a diagram illustrating a method for attaching or detaching a battery cover of an electronic device according to aspects of the present disclosure.

FIG. 4 is a diagram illustrating attachment/detachment of a battery cover of an electronic device according to aspects of the present disclosure. As illustrated, the battery cover 230 may be coupled to the rear housing 220 or may be easily separated from the rear housing 220. The battery cover 230 has a snap-fit latching member 327 disposed on an outline thereof, and the rear housing 220 has a fasten recess 222 for receiving the snap-fit latching member 327. When the rear housing 220 and the battery cover 230 are coupled to each other, the snap-fit latching member 327 is inserted in the fasten recess 222. When the battery cover 230 is coupled to or separated from the rear housing 220, the battery cover 230 may be elastically warp-transformed, as illustrated. Additionally or alternatively, the battery cover 230 may include an opening 325 for exposing the camera 113 received in the front housing 210 and the rear housing 220.

Figure 5:
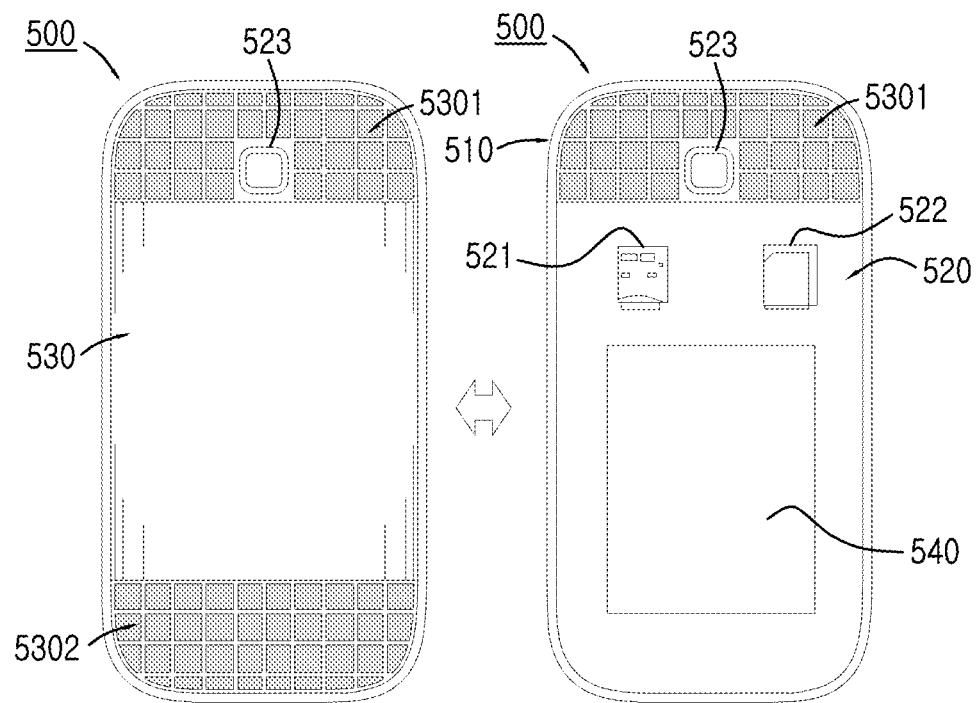
FIG. 5 is a rear view of an electronic device according to aspects of the present disclosure.

FIG. 5 is a rear view of an electronic device 500 according to aspects of the present disclosure. As illustrated, the electronic device 500 comprises a housing including a front housing (not shown), a rear housing 520, and a battery cover 530. The front housing and the rear housing 520 may be coupled to each other to form a space for receiving a mainboard, a touchscreen, a speaker, a microphone, an antenna, etc. of the electronic device 500. The rear housing 520 and the battery cover 530 may be coupled to each other to form a space for receiving a SIM card unit 521, a memory card unit 522, a battery 540, etc.

The battery cover 530 includes an upper battery cover 5301 and a lower battery cover 5302. The upper battery cover 5301 includes an opening exposing a rear camera 523, and may be coupled to the rear housing 520. The lower battery cover 5302 is coupled to the rear housing 520, and may be easily separated from the rear housing 520 to replace at least one of the SIM card unit 521, the memory card unit 522, and the battery 540. The lower battery cover 5302 may be separated from the rear housing 520, in the manner illustrated in FIG. 4, for example. When the lower battery cover 5302 is coupled to the rear housing 520, the upper battery cover 5301 and the lower battery cover 5302 may be substantially flush with each other to form a substantially smooth and continuous surface of the battery cover 530.

Figure 6:
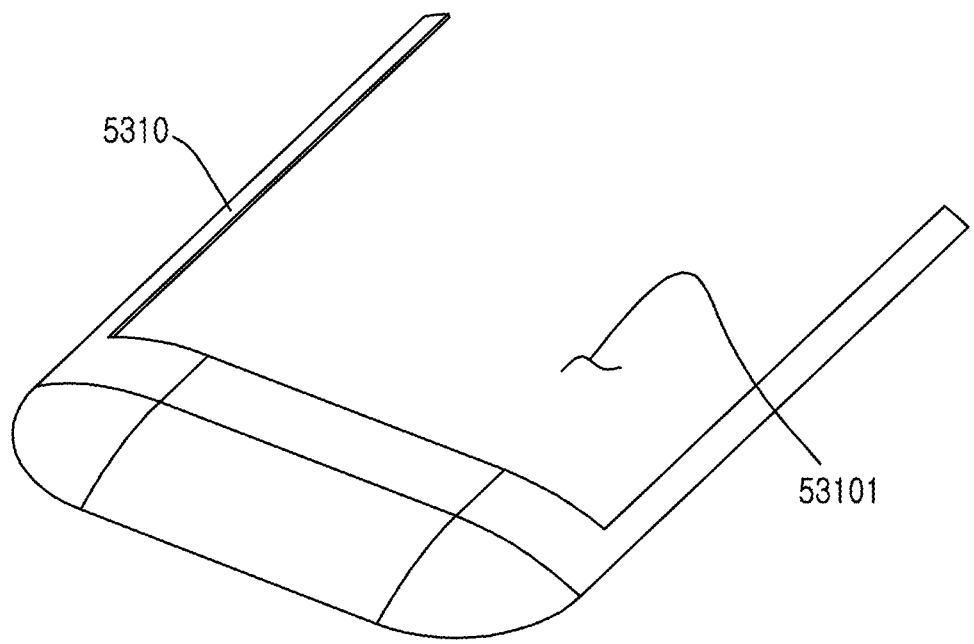
FIG. 6, FIG. 7A, FIG. 7B, FIG. 8A, FIG. 8B, FIG. 9, FIG. 10, FIG. 11, FIG. 12A, and FIG. 12B are diagrams illustrating a process for manufacturing an electronic device housing component, in accordance with aspects of the present disclosure.

FIGS. 6-12B are diagrams illustrating a process for manufacturing an electronic device housing component, in accordance with aspects of the present disclosure. Referring to FIG. 6, a 3-dimensional (3D) metal housing body 5310 is formed by press processing a metal plate made of aluminum, stainless steel, and/or any other suitable material. The metal housing body 5310 includes an opening 53101, as illustrated. In some implementations, the conductivity of the metal used to make the housing body 5310 may not exceed predetermined conductivity, such as 150 Ω/m, in order to block deterioration in performance of at least one antenna.

Figure 7A:
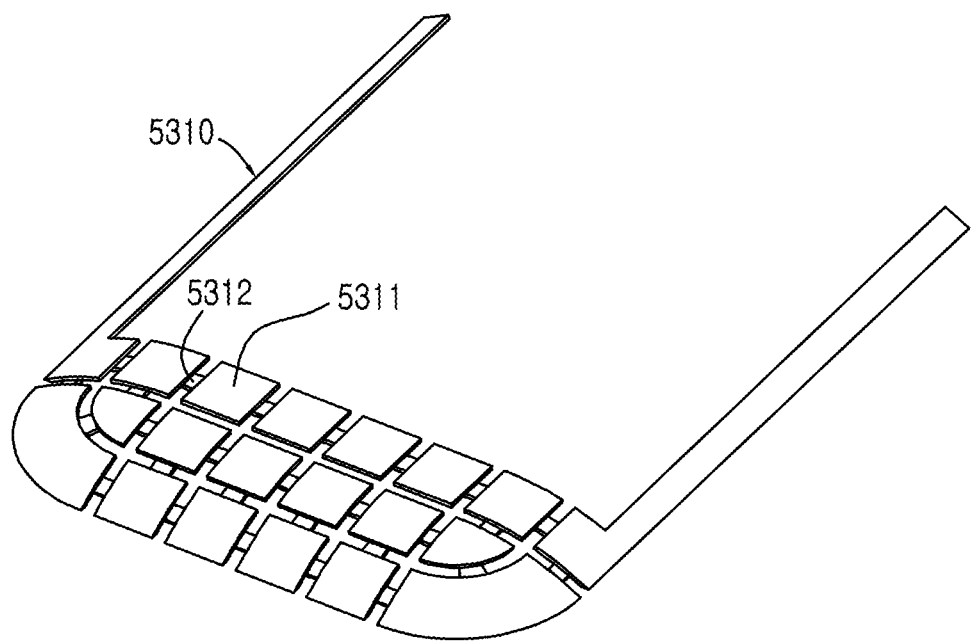
Figure 7B:
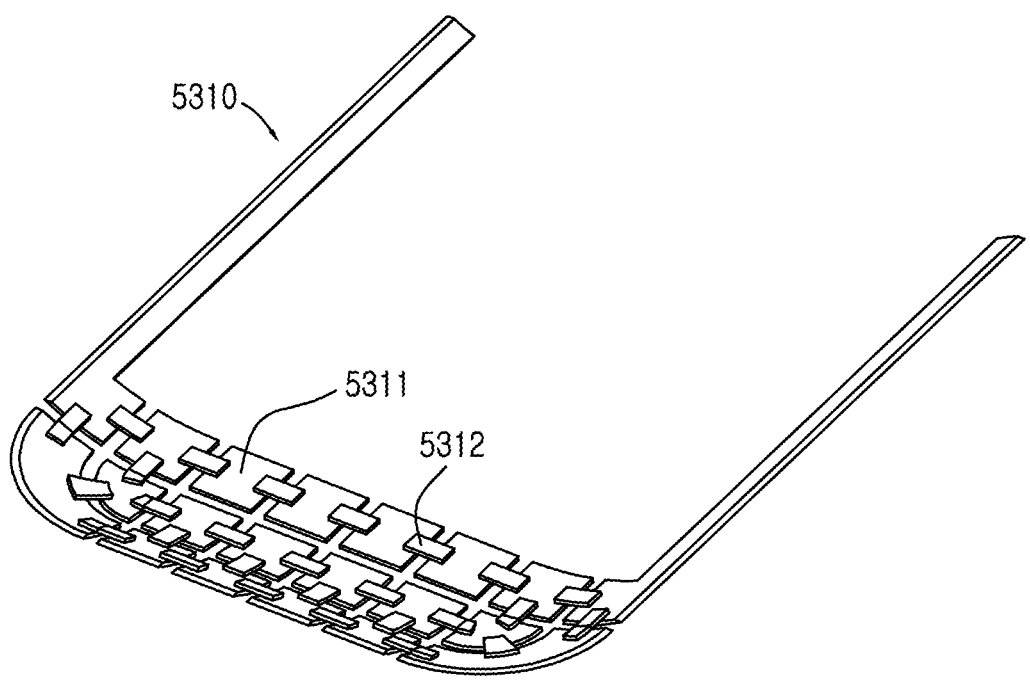

Referring to FIGS. 7A and 7B, the metal housing body 5310 is processed (e.g., by using an etching process or a cutting process) to form elements 5311 and bridges 5312 connecting the elements 5311. The elements 5311 are mutually held by the bridges 5312. The elements 5311 are disposed on the outer surface of the metal housing body 5310, and the bridges 5312 are disposed on the inner surface of the metal housing body 5310. In some aspects, the distance between any two of the elements 5311 may be the same or it may vary. Additionally or alternatively, in some aspects, the elements 5311 may all have the same shape or they may have two or more different shapes. Additionally or alternatively, in some aspects, the elements 5311 may be disposed in such a way, so as to form a regular pattern (e.g., a lattice pattern, as shown) or they may be disposed in an irregular pattern. For example, the elements 5311 may form a symmetric pattern with respect to any particular axis (e.g., a longitudinal axis of the housing body 310).

Figure 8A:
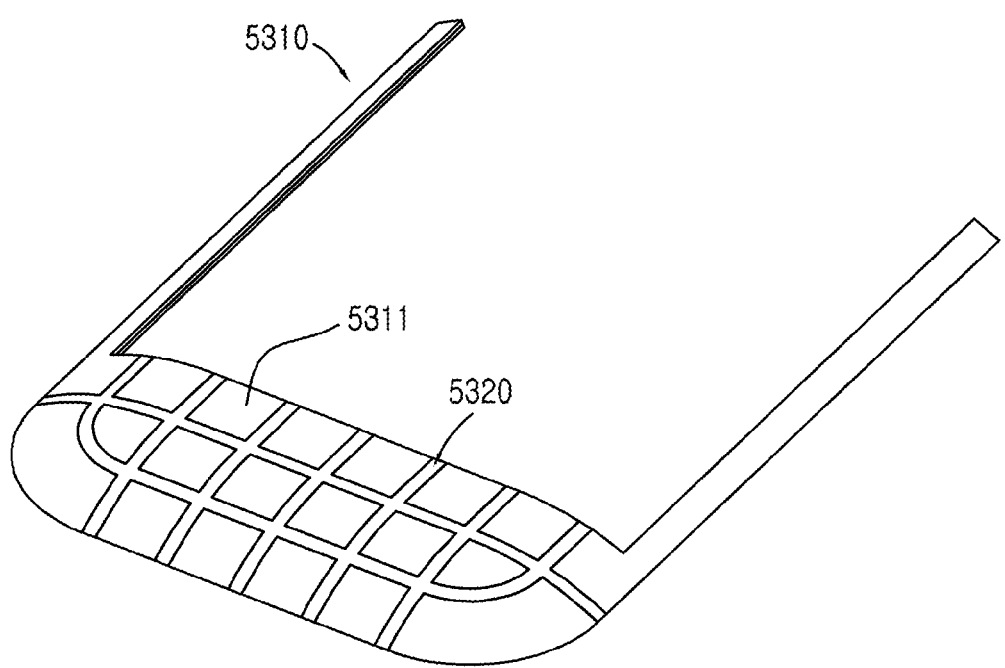
Figure 8B:
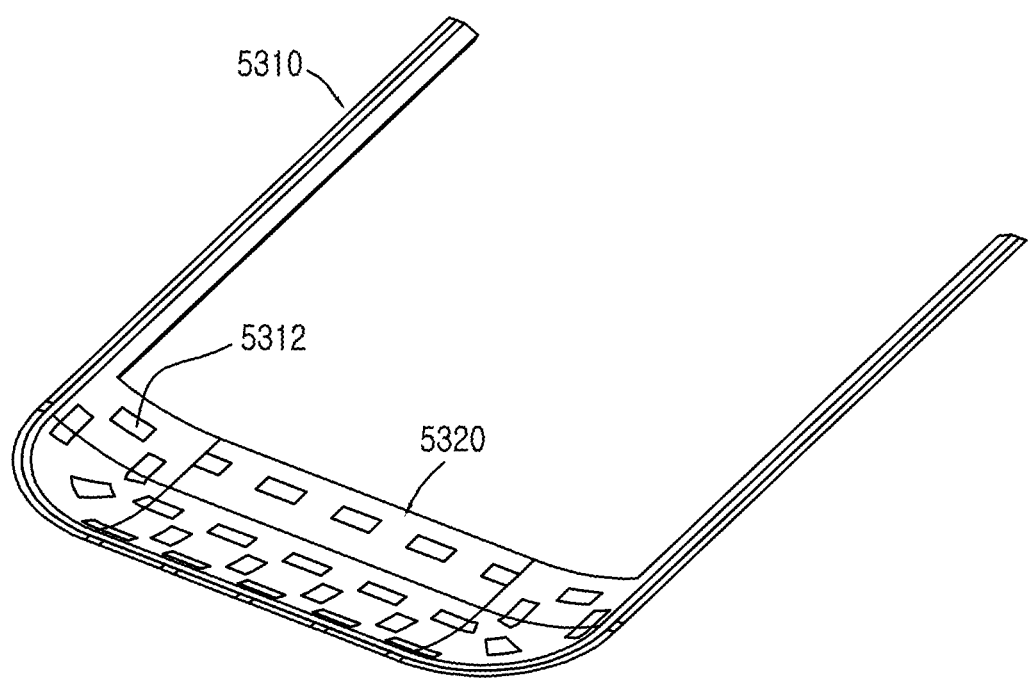

Referring to FIGS. 8A and 8B, a plastic injection member 5320 is formed on the inner surface of the etching-processed metal housing body 5310 via insert injection. More particularly, the spaces between the elements 5311 may be filled with molten plastic during the insert injection process in order to form a plastic injection member 5320 attached to the etching-processed metal housing body 5310. An adhesive may be coated on the etching-processed metal housing body 5310 during the insert injection, so that the molten plastic is more strongly attached to the metal housing body 5310. In some aspects, the plastic injection member 5320 may cover a sharp edge of the metal housing body 510 to prevent users from injuring themselves on the edge. Additionally or alternatively, in some aspects, the outer surface of the formed plastic injection member 5320 may be substantially flush with the elements 5311, so as to form a substantially smooth surface of the metal housing body 5310. Additionally or alternatively, in some aspects, the plastic injection member 5320 may be formed in such a way so as to not cover the bridges 5312 and leave them exposed. The plastic injection member 5320 may be formed of one of polycarbonate (PC), nylon, acryl, polyethyleneterephthalate (PET), epoxy, acrylonitrile-butadiene-styrene (ABS), phthalic anhydride (PA), polyphtalamide (PPA), polyphenylene sulfine (PPS), and/or any other suitable material. Also, the metal housing body 5310 may be post-processed and surface-treated for improving its appearance. This post processing is at least one of sanding, hairline etching, and buffing, and the surface treatment may be anodizing.

Figure 9:
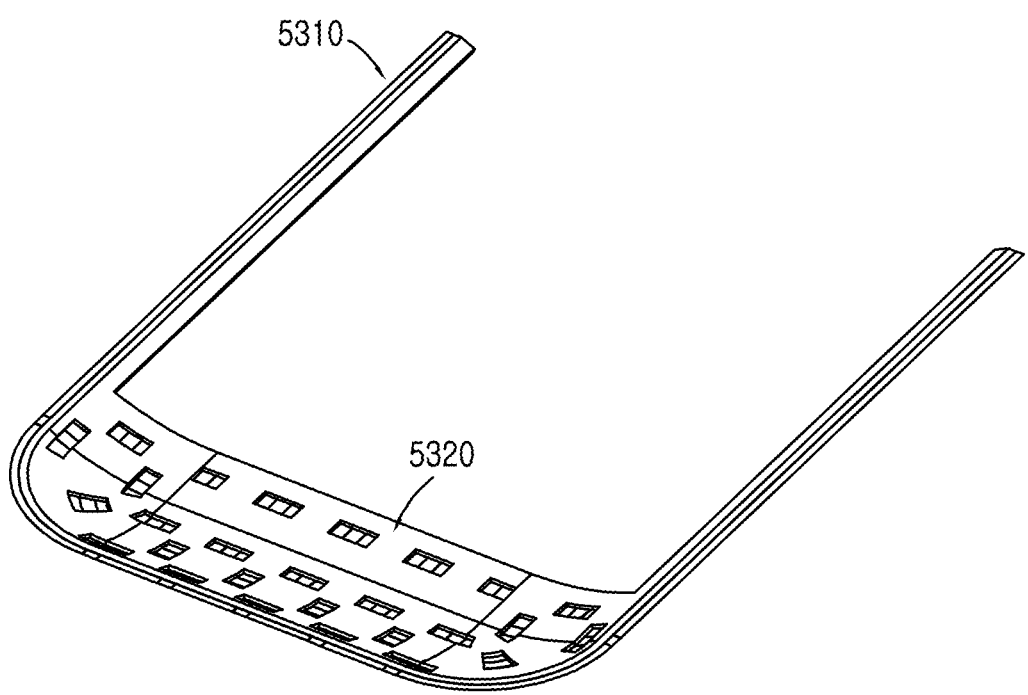

Referring to FIG. 9, the bridges 5312 of the metal housing body 5310 are removed (e.g., by a Computerized Numerical Control (CNC) process). The elements 5311, before the bridges 5312 are removed, are electrically connected and capable of interfering with the reception/transmission of signals by neighboring antenna(s) disposed underneath the metal housing body 5310. However, when the bridges 5312 are removed, the elements 5311 stop being electrically connected and become much less capable of interfering with the neighboring antenna(s)'s operation. When the bridges 5312 are removed, the elements 5311 are held together by the plastic injection member 5320. In some implementations, the thickness of the metal housing body 5310 that has passed through the CNC process may not exceed 1 mm.

Figure 10:
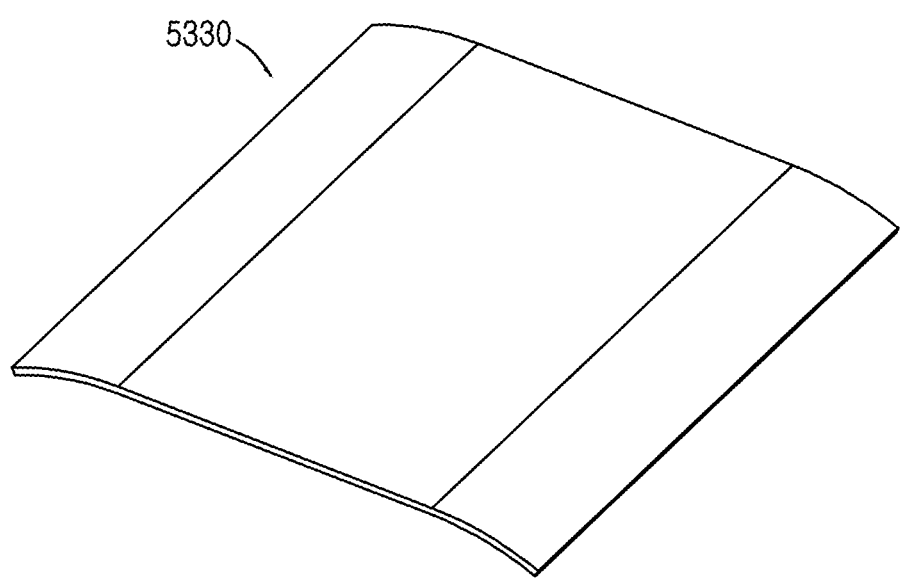

Referring to FIG. 10, a non-metal housing body 5330 is formed from a non-metal sheet via compression forming that uses a mold. Also, autoclave forming that uses an autoclave, and/or any other suitable technique, may be applied in substitution for the compression forming that uses a mold. The non-metal sheet may be a glass sheet, a glass fiber reinforced plastic (GFRP) sheet, and a carbon fiber reinforced plastics (CFRP) sheet. Also, the non-metal sheet may be a composite material sheet formed from a plurality of fiber basic materials (prepreg) with consideration of physical properties such as strength, ductility, elasticity, etc. Also, surface treatment such as soil-resistant processing, etc., printing, and post processing such as dyeing, painting, etc. may be performed on the non-metal housing body 5320. In some implementations, the thickness of the non-metal housing body 5330 processed in this manner may not exceed 1 mm.

Figure 11:
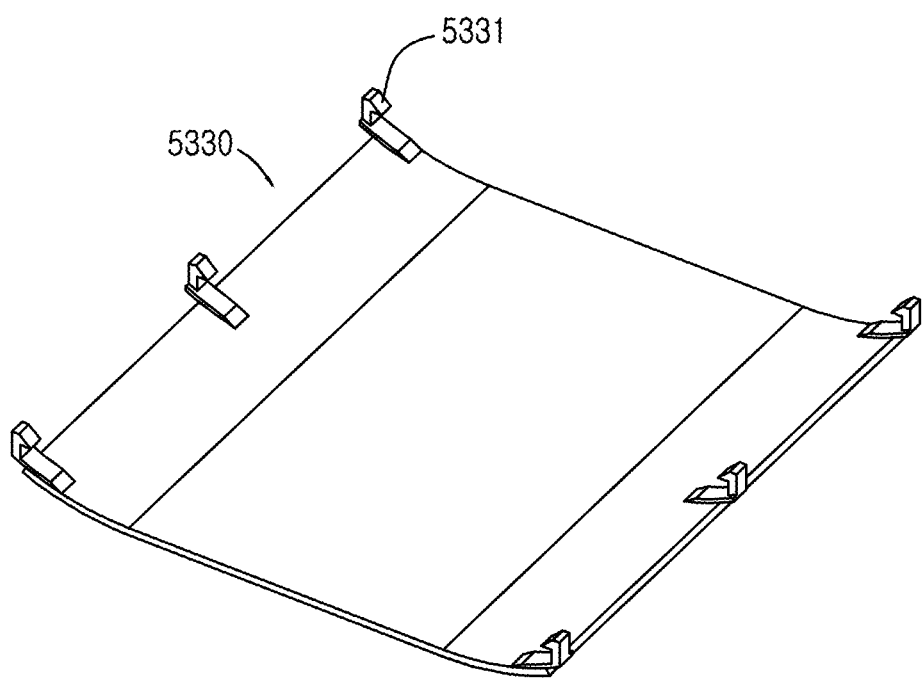

Referring to FIG. 11, a snap-fit latching member 5331 is attached to the inner outline of the non-metal housing body 5330. In some implementations, the snap-fit latching member 5331 may be attached by using an adhesive such as an Optically Clear Adhesive (OCA), a bond, or a hardening resin, among others. Additionally or alternatively, in some implementations, the snap-fit latching member 5331 may be formed on the non-metal housing body 5330 via insert injection.

Figure 12A:
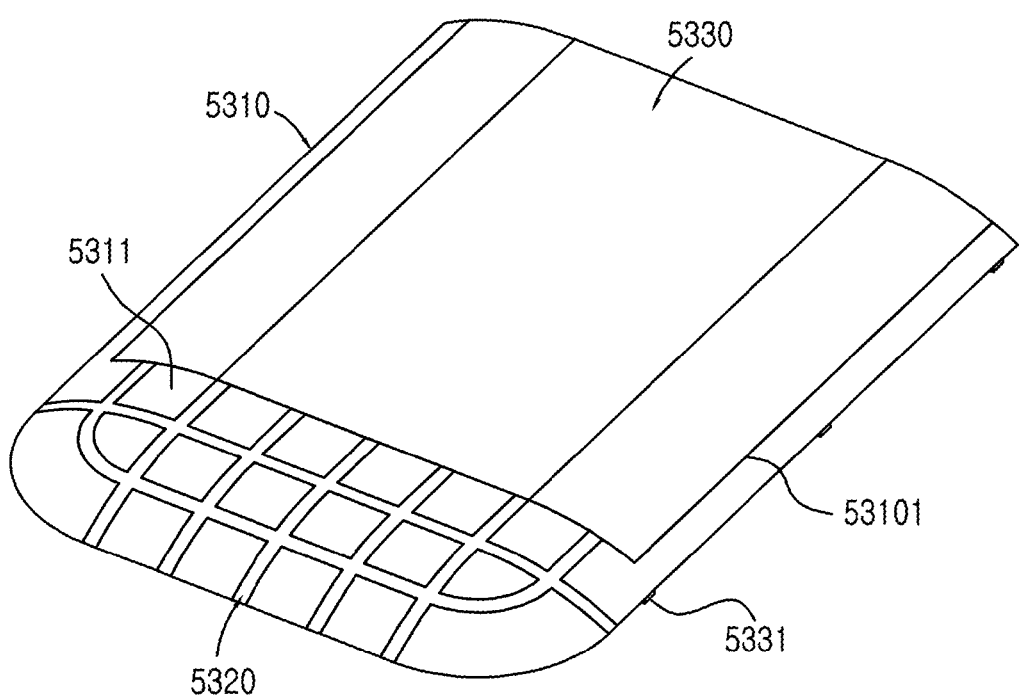
Figure 12B:
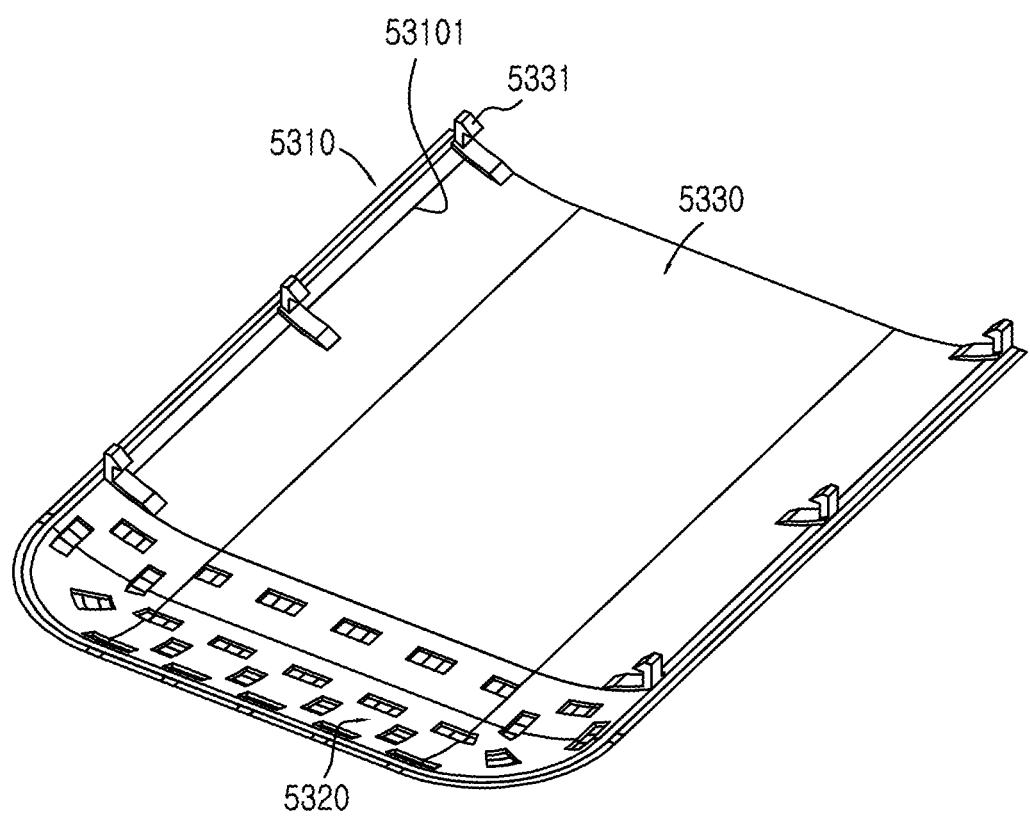

Referring to FIGS. 12A and 12B, the non-metal housing body 5330 is attached to the metal housing body 5310 to form a battery cover and/or any other housing enclosure component. As illustrated, the non-metal housing body 5330 is placed over the opening 53101 of the metal housing body 5310 and fit therein. In some implementations, the non-metal housing body 5330 may cover the edge of the opening 53101. Alternatively, in some implementations, the non-metal housing body 5330 may be inserted in the opening 53101, so that it is substantially flush with the edge of the opening 53101.

Figure 13:
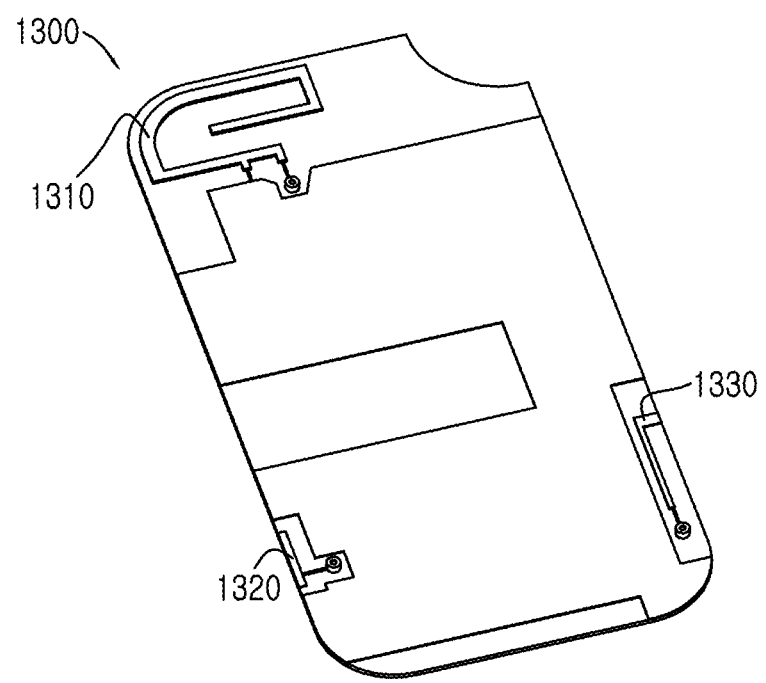
FIG. 13 is a diagram of a mainboard according to aspects of the present disclosure.

FIG. 13 is a diagram of a mainboard 1300 according to aspects of the present disclosure. As illustrated, the mainboard 1300 may include a substrate on which basic circuit(s) and/or a plurality of electronic parts are mounted. In addition, the mainboard 1300 may include a plurality of antennas. By way of example, the antennas may be mounted on the substrate in the form of a thin plate, or may be fixed to an injection material (carrier) attached on the mainboard 1300. The antennas may be disposed on the upper edge of the mainboard 1300. The antennas may include an antenna for cellular use 1310, an antenna 1320 for Bluetooth use, and an antenna 1330 for Global Positioning System (GPS) use. The antennas 1310, 1320, and 1330 may be disposed inside a housing that includes the assembly discussed with respect to FIGS. 12A and 12B. As noted above, because the non-metal housing body 5330 is made of non-metal, it may let signals to travel to/from the antennas without blocking these signals. Similarly, because the metal elements 5311 of the metal housing body 5310 are separated and electrically insulated from one another, the metal housing body 5310 may also permit signals to travel to/from the antennas without blocking these signals.

Figure 14:
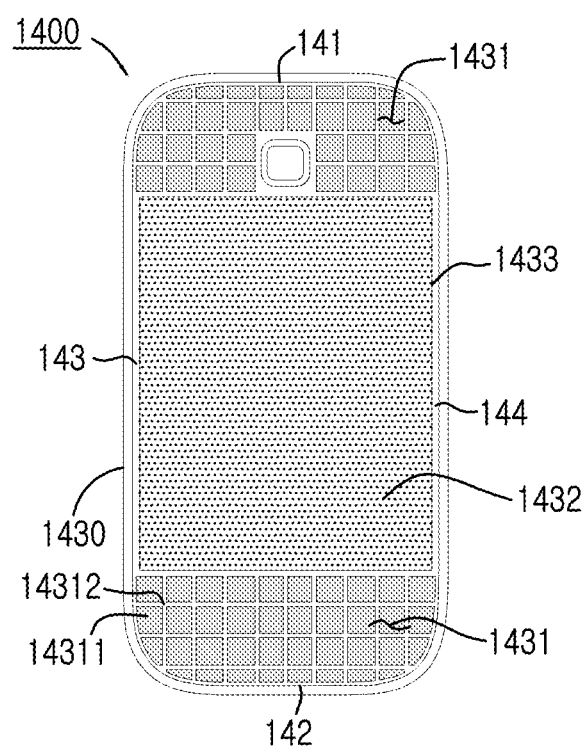
FIG. 14, FIG. 15, FIG. 16, FIG. 17, FIG. 18 and FIG. 19 are diagrams of different examples of electronic device housing enclosures according to aspects of the present disclosure.
Figure 15:
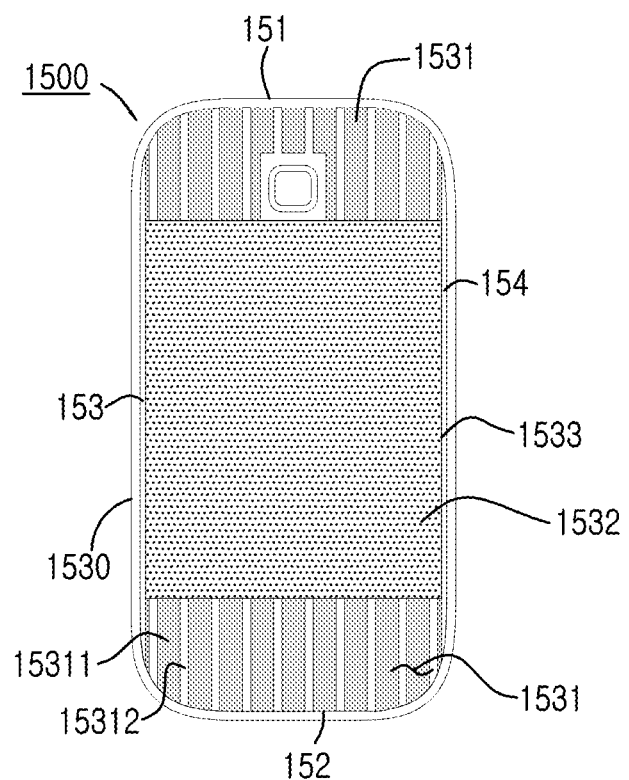
Figure 16:
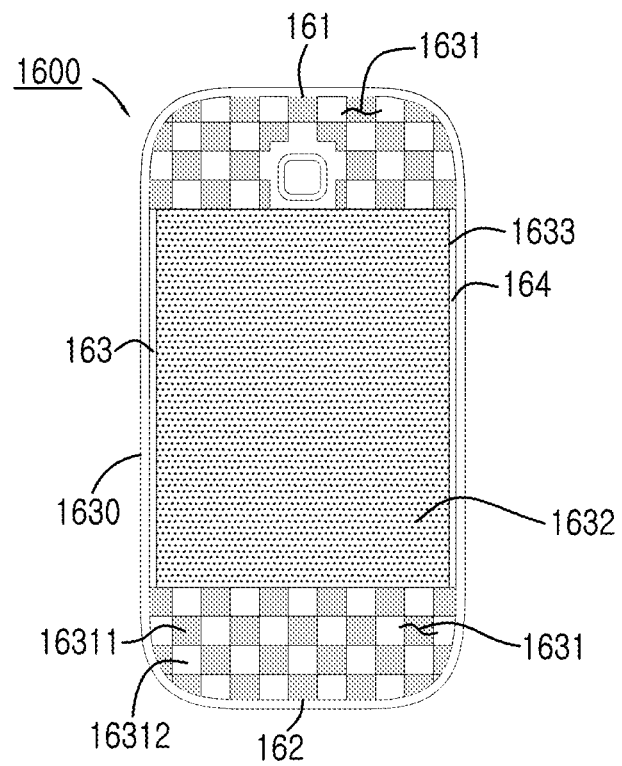

FIGS. 14 to 16 are diagrams of different examples of electronic device housing enclosures according to aspects of the present disclosure. Referring to FIG. 14, an example of a housing 1400 is shown. The housing 1400 includes a front housing (not shown), a rear housing (not shown), and a battery cover 1430. The front housing and the rear housing are coupled to each other to form a space for receiving a mainboard, a touchscreen, a speaker, a microphone, an antenna, etc. Also, the rear housing and the battery cover 1430 are coupled to each other to form a space for receiving a SIM card unit, a memory card unit, a battery, etc. The battery cover 1430 includes a first housing member 1431, and a second housing member 1432 coupled to the first housing member 1431. The first housing member 1431 has an opening 1433 and has relatively thin left and right edges 143 and 144 compared to upper and lower edges 141 and 142. The opening 1433 has a rectangular shape generally, and the second housing member 1432 is inserted in this opening 1433 and fit therein. In some implementations, the portion of the second housing member 1432 disposed in the opening 1433 of the first housing member 1431 may be substantially flush with the first housing member 1431 to form a substantially smooth surface. Additionally or alternatively, in some implementations, portions of the second housing member 1432 may overlap at least partially with the edges 143 and 144 of the battery cover 1430. The first housing member 1431 includes metal elements 14311 separated from one another and suspended in a plastic injection member 14312 formed by insert injection as described in detail with reference to FIGS. 6 and 12B.

Referring to FIG. 15, an example of a housing 1500 is shown. The housing 1500 includes a front housing (not shown), a rear housing (not shown), and a battery cover 1530. The front housing and the rear housing are coupled to each other to form a space for receiving a mainboard, a touchscreen, a speaker, a microphone, an antenna, etc. Also, the rear housing and the battery cover 1530 are coupled to each other to form a space for receiving a SIM card unit, a memory card unit, a battery, etc. The battery cover 1530 includes a first housing member 1531, and a second housing member 1532 coupled to the first housing member 1531. The first housing member 1531 has an opening 1533 and has relatively thin left and right edges 153 and 154 compared to upper and lower edges 151 and 152. The opening 1533 has a rectangular shape generally, and the second housing member 1532 is inserted in this opening 1533 and fit therein. In some implementations, the portion of the second housing member 1532 disposed in the opening 1533 of the first housing member 1531 may be substantially flush with the first housing member 1531 to form a substantially smooth surface. Additionally or alternatively, in some implementations, portions of the second housing member 1532 may overlap at least partially with the edges 153 and 154 of the battery cover 1530. The first housing member 1531 has metal elements 15311 separated from one and attached to a plastic injection member 15312 formed by insert injection as described in detail with reference to FIGS. 6 and 12B. As illustrated, the metal elements 15311 have an elongated "stripe" shape and may be disposed at a predetermined separation distance from one another.

Referring to FIG. 16, an example of a housing 1600 is shown. The housing 1600 includes a front housing (not shown), a rear housing (not shown), and a battery cover 1630. The front housing and the rear housing are coupled to each other to form a space for receiving a mainboard, a touchscreen, a speaker, a microphone, an antenna, etc. Also, the rear housing and the battery cover 1630 are coupled to each other to form a space for receiving a SIM card unit, a memory card unit, a battery, etc. The battery cover 1630 includes a first housing member 1631, and a second housing member 1632 coupled to the first housing member 1631. The first housing member 1631 has an opening 1633 and has relatively thin left and right edges 163 and 164 compared to upper and lower edges 161 and 162. The opening 1633 has a rectangular shape, and the second housing member 1632 is inserted in this opening 1633 and fit therein. In some implementations, the portion of the second housing member 1632 disposed in the opening 1633 of the first housing member 1631 may be substantially flush with the first housing member 1631 to form a substantially smooth surface. Additionally or alternatively, in some implementations, portions of the second housing member 1632 may overlap at least partially with the edges 163 and 164 of the battery cover 1630. The first housing member 1631 has metal elements 16311 separated from one another and attached to a plastic injection member 16312 formed by insert injection as described in detail with reference to FIGS. 6 and 12B. As illustrated in this example, the metal elements 16311 and the plastic injection member 16312 may be used to form various patterns in combination with one another, such as a lattice or checkered pattern.

Figure 17:
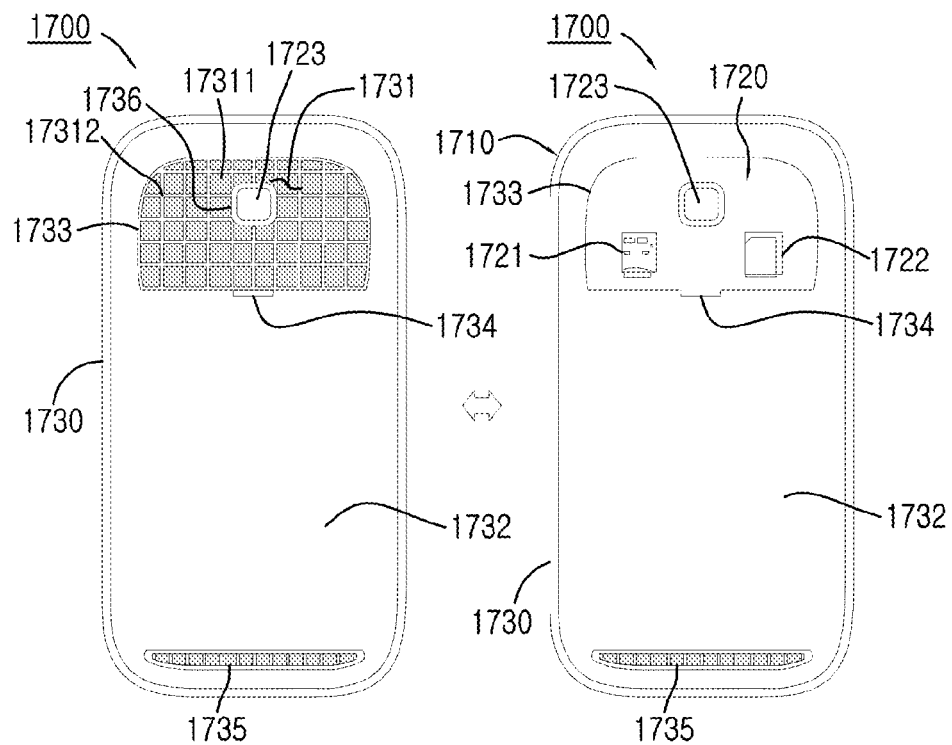
Figure 18:
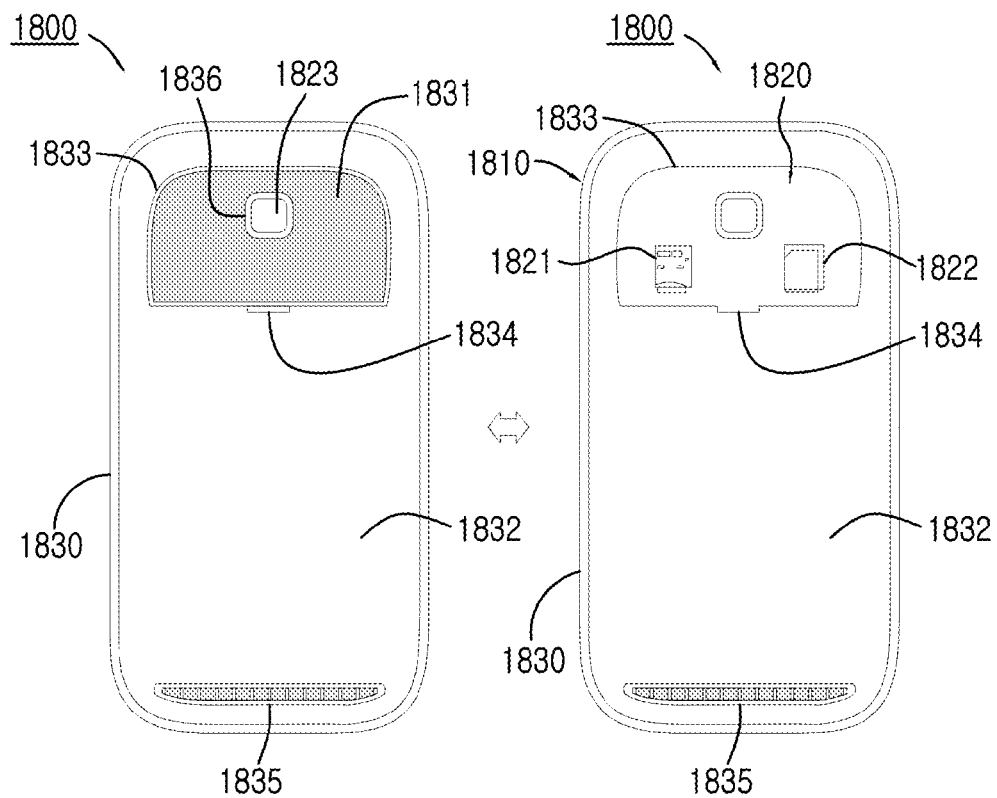
Figure 19:
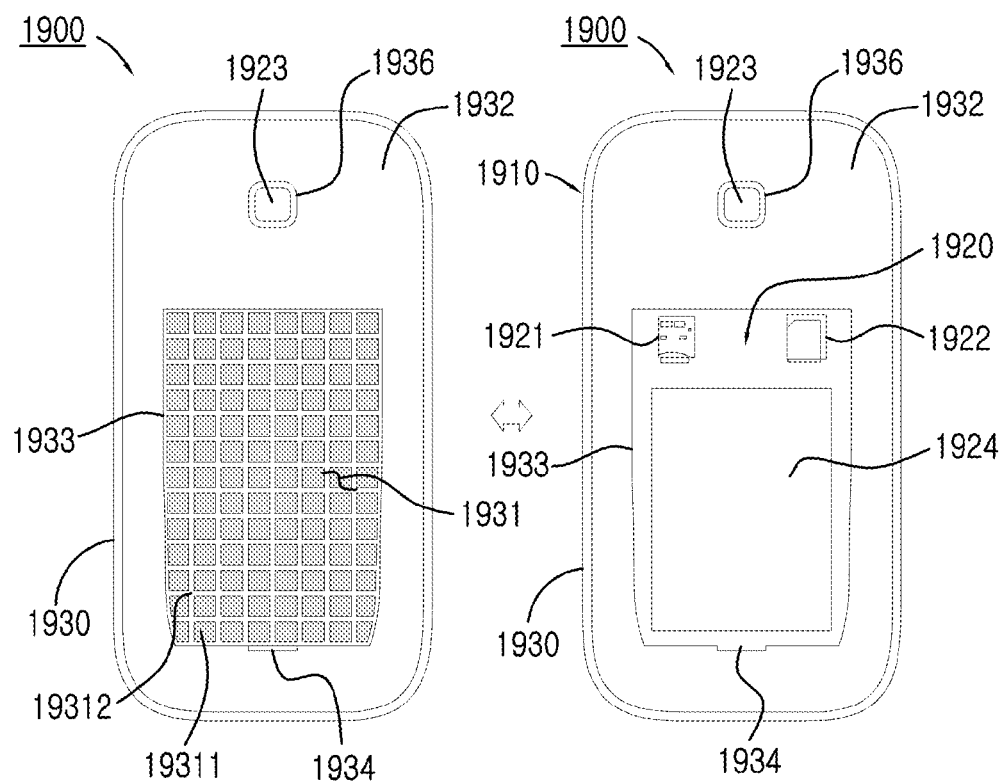

FIGS. 17 to 19 are diagrams illustrating different examples of electronic device housing enclosures in accordance with aspects of the disclosure. Referring to FIG. 17, an example of a housing 1700 is shown. The housing 1700 includes a front housing (not shown), a rear housing 1720, and a battery cover 1730. The front housing and the rear housing 1720 are coupled to each other to form a space for receiving a mainboard, a touchscreen, a speaker, a microphone, an antenna, etc. Also, the rear housing 1720 and the battery cover 1730 are coupled to each other to form a space for receiving a SIM card unit, a memory card unit, a battery, etc. The battery cover 1730 includes a first housing member 1731 and a second housing member 1732 that is detachable from the first housing member 1731. The second housing member 1732 has an opening 1733, and the first housing member 1731 is inserted in this opening. In this example, the opening 1733 may include an inner edge that extends in an inward direction for safely seating the first housing member 1731. In some implementations, the inner edge may be recessed relative other parts of the housing member 1732, so as to permit the first housing member 1731 to be substantially flush with the second housing member 1732 when the first housing member 1731 is placed in the opening 1733. Also, the first housing member 1731 has an opening 1736 exposing a rear camera 1723, and the second housing member 1732 has a hole 1735 for discharging sound produced by a speaker. The first housing member 1731 includes metal elements 17311 separated from one another and held together by a plastic injection member 17312 formed by insert injection as described in detail with reference to FIGS. 6 to 12B. When the first housing member 1731 is separated from the second housing member 1732 using a recess 1734, the SIM card unit 1721 and the memory card unit 1722 are exposed. In some implementations, the second housing member 1732 may be a non-metal sheet such as a glass sheet, and at least one antenna of the electronic device may be disposed underneath the second housing member 1732.

Referring to FIG. 18, an example of a housing 1800 is shown. The housing 1800 includes a front housing (not shown), a rear housing 1820, and a battery cover 1830. The front housing 1810 and the rear housing 1820 are coupled to each other to form a space for receiving a mainboard, a touchscreen, a speaker, a microphone, an antenna, etc. Also, the rear housing 1820 and the battery cover 1830 are coupled to each other to form a space for receiving a SIM card unit, a memory card unit, a battery, etc. The battery cover 1830 includes a first housing member 1831 and a second housing member 1832 that is detachable from the first housing member 1831. The second housing member 1832 has an opening 1833, and the first housing member 1831 is inserted in this opening 1833 and fit therein. In some implementations, the opening 1833 may include an inner extending in an inward direction for seating the first housing member 1831. In some implementations, the inner edge may be recessed relative other parts of the housing member 1832, so as to permit the first housing member 1831 to be substantially flush with the second housing member 1832 when the first housing member 1831 is placed in the opening 1833. Also, the first housing member 1831 has an opening 1836 exposing a rear camera 1823, and the second housing member 1832 has a hole 1835 for releasing sound produced by a speaker disposed in the housing 1800. The first housing member 1831 has an integral type metal plate. When the first housing member 1831 is separated from the second housing member 1832 using a recess 1834, the SIM card unit 1821 and the memory card unit 1822 are exposed. Also, the second housing member 1832 may be a non-metal sheet, such as a glass sheet, and at least one antenna of the electronic device is disposed underneath the second housing member 1832 in the housing 1800.

Referring to FIG. 19, an example of a housing 1900 is shown. As illustrated, the housing 1900 includes a front housing (not shown), a rear housing 1920, and a battery cover 1930. The front housing and the rear housing 1920 are coupled to each other to form a space for receiving a mainboard, a touchscreen, a speaker, a microphone, an antenna, etc. Also, the rear housing 1920 and the battery cover 1930 are coupled to each other to form a space for receiving a SIM card unit, a memory card unit, a battery, etc. The battery cover 1930 includes a first housing member 1931 and a second housing member 1932 detachable from the first housing member 1931. The second housing member 1932 has an opening 1933, and the first housing member 1931 is inserted in this opening 1933. In this example, the opening 1933 may have an inner edge that extends in an inward direction for seating the first housing member 1931. In some implementations, the inner edge may be recessed relative other parts of the housing member 1932, so as to permit the first housing member 1931 to be substantially flush with the second housing member 1932 when the first housing member 1931 is placed in the opening 1933. Also, the first housing member 1931 includes an opening 1936 exposing a rear camera 1923. The first housing member 1931 has metal elements 19311 separated from one another and held together by a plastic injection member 19312 formed by insert injection as described in detail with reference to FIGS. 6 to 12B. As illustrated, the metal elements 19311 and the plastic injection member 19312 may form a lattice pattern. When the first housing member 1931 is separated from the second housing member 1932 using a recess 1934, the SIM card unit 1921 and the memory card unit 1922 are exposed. In some implementations, the second housing member 1932 may be a non-metal sheet such as a glass sheet, and at least one antenna of the electronic device may be disposed underneath the second housing member 1932 in the housing 1900.

Figure 20:
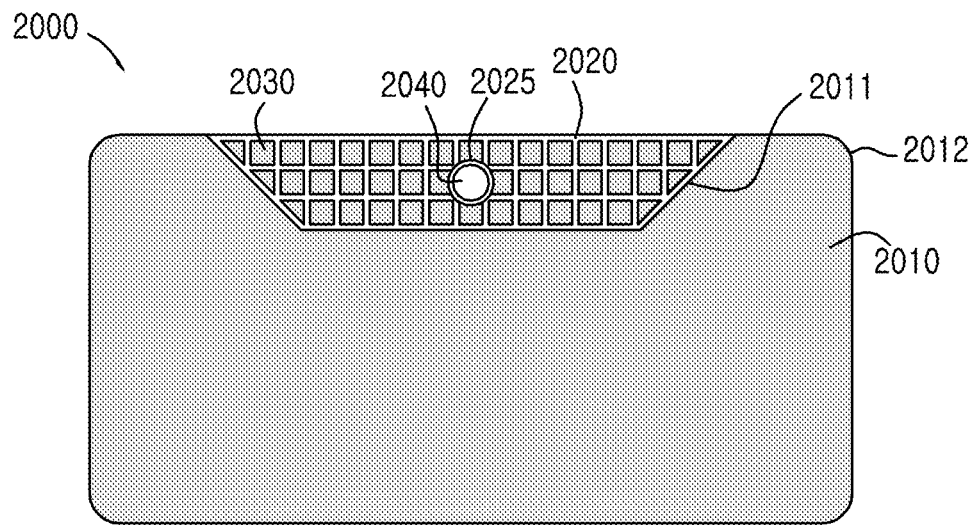
FIG. 20 and FIG. 21 are diagrams of different examples of tablet Personal Computer (PC) housing enclosures according to aspects of the present disclosure.
Figure 21:
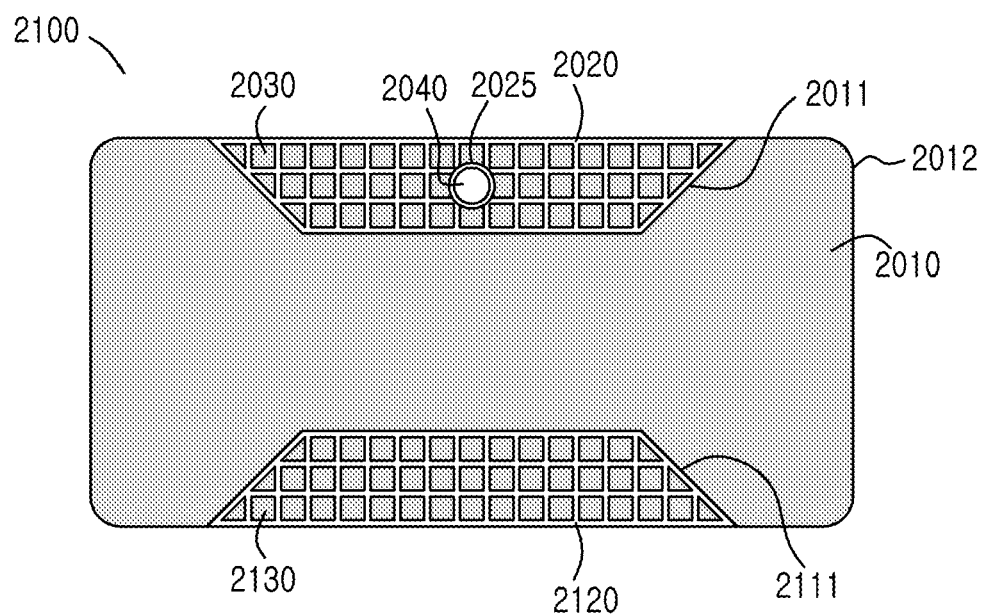

FIGS. 20 and 21 are diagrams illustrating different examples of a tablet Personal Computer (PC) housing enclosures according to aspects of the present disclosure. Referring to FIG. 20, an example of a tablet PC 2000 is shown. As illustrated, the tablet PC 2000 includes a, a rear housing disposed in the rear of the tablet PC 2000 and including a metal portion 2010, a plastic injection portion 2020, and metal elements 2030. The metal portion 2010 of the rear housing illustrated in FIG. 20 may include an opening 2011. The opening 2011, in some implementations, may be disposed on the side of the metal portion 2010 so that it has one open end. A portion of the plastic injection portion 2020 is inserted in this opening 2011 and fit therein, and the rest of the plastic injection portion 2020 is attached to the lower surface of the metal portion 2010 and disposed to overlap the metal portion 2010. In this example, the plastic injection portion 2020 together with the metal elements 2030 is disposed in the opening of the metal portion 2010. Additionally or alternatively, the outer surface of the portion of the plastic injection portion 2020 may be flush with the metal portion 2010, so as to form a smooth surface. Additionally or alternatively, opening 2025 is formed in the plastic injection portion 2020 disposed in the opening 2011, and the camera 2040 is exposed via the opening 2025.

Metal elements 2030 are attached on the outer surface of the plastic injection portion 2020, as discussed with respect to FIGS. 6 to 12B. Additionally or alternatively, a snap-fit latching member may be formed in advance via insert injection. Since the metal elements 2030 do not protrude from the outer surface of the plastic injection portion 2020, the outer surface of the tablet PC may appear as one continuous and smooth surface.

Referring to FIG. 21, an example of a PC tablet 2100 is shown. In this example, the PC tablet 2100 includes an opening 2111 facing the opening 2011, an injection portion 2120 disposed in the opening, and metal elements 2130 disposed in the opening. In this example, the opening 2111, the injection portion 2120, and the metal elements 2130 are identical to the opening 2011, the injection portion 2020, and the metal elements 2030, respectively. However, in other examples one or more of the elements 2110, 2120, and 2130 may differ in shape, pattern, or size from one or more of the elements 2010, 2020, and 2030, respectively.

Although the disclosure has been provided with reference to certain specific examples, it will be understood by those skilled in the art that various changes in form and details may be made therein without departing from the spirit and scope of the disclosure as defined by the appended claims and their equivalents. It should be noted that the above techniques and methods may be used to manufacture any given component of an electronic device's housing, such as a front housing component, for example. Therefore, the scope of the present disclosure should not be limited to the above-described embodiments but should be determined by not only the appended claims but also the equivalents thereof.

What is claimed is:

1. An electronic device comprising:
   a plurality of electronic parts;
   one or more housing components forming a space for receiving the plurality of electronic parts;
   a cover detachable from the one or more housing components, the cover including a first member having a plurality of metal elements suspended in a non-metal base and a second member coupled to the first member; and
   at least one latching member fixed in the first or second member, for coupling the cover with the one or more housing components.

2. The electronic device of claim 1, wherein at least a portion of the second member is disposed in an opening formed in the first member.

3. The electronic device of claim 1, wherein at least a portion of the first member is disposed in an opening formed in the second member.

4. The electronic device of claim 1, wherein at least a portion of the first member overlaps the second member.

5. The electronic device of claim 1, wherein the first member and the second member are detachable from one another.

6. The electronic device of claim 1, wherein an outer surface of the first member is substantially flush with an outer surface of the second member.

7. The electronic device of claim 1, wherein the metal elements are arranged to form a pattern that is symmetrical with respect to an axis of the electronic device.

8. The electronic device of claim 7, wherein the one or more housing components include at least one of a front housing component and a rear housing component.

9. The electronic device of claim 1, further comprising at least one antenna disposed inside a housing formed by the one or more housing components and the cover, wherein the at least one antenna is disposed underneath one of the first member and the second member.

10. An electronic device comprising:
   a front housing component;
   a rear housing component coupled with the front housing component to form a space for receiving a plurality of electronic parts of the electronic device; and
   a detachable cover coupled with the rear housing component to form a space for receiving at least one of a Subscriber Identity Module (SIM) card, a memory card, and a battery, the cover comprising:
   a first member comprising a plurality of separated metal elements suspended in a non-metal base and forming an outer surface of the first member in which portions of the non-metal base fill spaces between the metal elements so that the portions of the non-metal base are substantially flush with the plurality of metal element's outer surfaces; and
   a second member coupled to the first member by a latching member that is part of the second member, so that an outer surface of the second member is substantially flush with the outer surface of the first member.

* * * * *